United States Patent
Pollock et al.

(10) Patent No.: US 6,510,819 B1
(45) Date of Patent: Jan. 28, 2003

(54) INLET BAFFLE FOR WATER HEATER

(75) Inventors: F. Martin Pollock, Piqua, OH (US); Joyce A. Ahrens, Versailles, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 09/669,138

(22) Filed: Sep. 26, 2000

(51) Int. Cl.[7] .................................................. F22B 1/00
(52) U.S. Cl. .................... 122/4 R; 122/13.01; 122/19.1; 122/32; 137/591
(58) Field of Search ................................ 122/4 R, 19.1, 122/32, 285, 293, 13.01; 392/452, 491; 137/561 A, 590, 591

(56) References Cited

U.S. PATENT DOCUMENTS

| 3,381,111 A | 4/1968 | Popyk .......................... 219/312 |
| 3,597,588 A | 8/1971 | Kirschner et al. ........... 219/314 |
| 3,597,589 A | 8/1971 | Morgan ........................ 219/321 |
| 3,666,918 A | 5/1972 | Clark, Jr. et al. ............ 219/314 |
| 3,807,365 A * | 4/1974 | Lyman et al. .................. 122/32 |
| 3,868,494 A | 2/1975 | Pepin ........................... 219/341 |
| 3,889,641 A * | 6/1975 | Mayer et al. ................... 122/32 |
| 4,169,558 A | 10/1979 | Coates ...................... 239/553.5 |
| 5,092,279 A * | 3/1992 | Barmore ..................... 122/19.1 |
| 6,199,515 B1 * | 3/2001 | Clarke ......................... 122/4 R |

* cited by examiner

*Primary Examiner*—Jiping Lu
(74) *Attorney, Agent, or Firm*—Thompson Hine LLP

(57) ABSTRACT

A baffle for slowing the incoming water flow into a booster heating tank so that the turbulence in the water tank is minimized. The baffle consists of an inner cap and outer cap which are positioned over the inlet to a water heating tank. The outer cap is spaced apart from the inner cap such that the incoming water flows through openings in the inner cap and is directed to the underside of the outer cap. The water, having been sufficiently slowed by the contact with the underside of the outer cap, then smoothly flows downward along the outer cap flange and into the main plenum of the tank.

7 Claims, 6 Drawing Sheets

INLET BAFFLE FOR WATER HEATER

BACKGROUND OF THE INVENTION

This invention relates to liquid heating and storage tanks, and more particularly to a baffle for use in connection with the water inlet for such a heating and storage tank. More particularly, the baffle of the present invention may preferably be used in connection with known water boosters of the type that are used to raise the temperature of water to a desired level for use by a downstream user, generally a commercial warewashing apparatus. The use of the baffle of the present invention with these types of boosters increases the heating efficiency of the booster, thereby lowering energy usage and costs for the user, lowers the time required to heat the water to the desired temperature, and helps to provide water to the downstream user at a consistent temperature.

Warewashing apparatuses, such as conveyor and batch type warewashing or dishwashing machines, generally receive water at a temperature of around 110° from the central hot water supply of most buildings and houses. However, in order to comply with health regulations, warewashing systems that do not utilize a sodium hypochlorite sanitizing system or the like are required to sanitize the ware being washed with a rinse using a minimum of 180° F. water. Furthermore, the use of a 180° F. water rinse is desirable because it facilitates the drying of the ware, thereby decreasing the turnaround time necessary for reuse. This high temperature is generally out of the range available from most buildings and houses central hot water source. Thus, in order to supply water at this desirable temperature, boosters have been employed to raise the temperature of the incoming water from between 110° F. to the required sanitizing temperature of 180° minimum. However, with respect to these booster type heaters, research has shown that a relatively standard water tank having a heater positioned in a center thereof develops stratified temperature gradients within the tank based upon the location of the heater. This research has shown that the water above the heater tends to be hotter than the water below the heater. Accordingly, in order to use the least amount of energy to heat only the water needed to the required temperature at the time it is needed for the next washing cycle, it is desirable to use only this hotter "upper portion" of the water for each rinsing cycle, thereby allowing the cooler "lower portion" of the water to be raised up by the incoming water and heated for the next cycle.

In trying to take advantage of this stratified temperature gradient, though, some problems have arisen. Namely, in prior art systems, the incoming water replacing the outgoing "hotter" rinsing water generally enters the tank in a relatively turbulent, uncontrolled manner. This incoming water disrupts the temperature gradient in the tank thereby detrimentally effecting the temperature consistency of the outgoing water. Therefore, in order to provide heated water at the desired temperature consistently, it would be desirable to control the incoming water in a way in which the disruption of the stratified temperature gradient in the tank is prevented. Preferably, the control of the incoming water can be handled in a manner that is relatively simple and inexpensive, which would not require the use of significant control means, valves, etc., and which would help to provide water at the desired temperature in a relatively efficient manner.

SUMMARY OF THE INVENTION

In accordance with the present invention, a method and apparatus for controlling incoming water flow into a water heating tank is provided. Specifically, the present invention provides a baffle for slowing the incoming water flow into a booster heating tank so that the turbulence in the water tank is minimized. More specifically, a baffle is provided which is of relatively simple construction, which is generally inexpensive to produce, and which may be used in water boosters of the type used in commercial warewashing applications. The baffle is characterized in that it comprises a cap including a water diverting member, such as a flange, which depends downwardly from the edges of the cap. This water diverting member performs the critical task of diverting the water that flows in the inlet backwards (generally downward in a booster having an inlet proximate the bottom of the water holding tank and an outlet substantially proximate the top portion of the water holding tank) away from the outlet and the heating element.

In a preferred embodiment, the baffle of the present invention preferably consists of an inner cap and outer cap which are positioned over the inlet to a water heating tank. The inner cap is preferably provided with openings of varying shapes and sizes that are designed to direct the incoming flow of the water against the underside of the outer cap. The outer cap is positioned over the inner cap and includes a flange that extends around the outer edges thereof. The outer cap is spaced apart from the inner cap such that the incoming water flows through the openings in the inner cap and is directed to the underside of the outer cap. The water, having been sufficiently slowed by the contact with the underside of the outer cap, then flows downward along the outer cap flange and into the main plenum of the tank. The positioning of the flange is such that direct movement of the water from the underside of the cap along the walls of the water tank and out the outlet is prevented thus insuring that the "hotter" water above the heater is removed from the tank first, leaving the "cooler" water to continue to heat in preparation for the next cycle of the warewasher. As will be discussed in greater detail below, use of the baffle of the present invention in the manner herein described has resulted in a better, more consistent temperature gradient in the booster output water temperature, thereby increasing the energy efficiency and utility of the water boosters in which it has been implemented.

In a preferred embodiment, the inner and outer caps could be configured from round or square tubing. A cost effective method is represented herein wherein a flat sheet of metal can be laser cut efficiently and relatively inexpensively. The cut sheet then can simply be formed or folded from the flats.

As stated herein, the principal object of the invention is to provide an improvement in water heating boosters which aids in providing heated water to a downstream user having a relatively consistent temperature gradient, in an efficient manner. It is to be understood that while the specification primarily refers to water as being the substance being re-directed by the baffle of the present invention, the baffle could be used to divert and control the flow of other fluids, and this use would be considered within the scope of the present invention. Other objects and advantages will become apparent from the following description, in which reference is made to the accompanying drawings.

DETAILED DESCRIPTION

Figure 1:
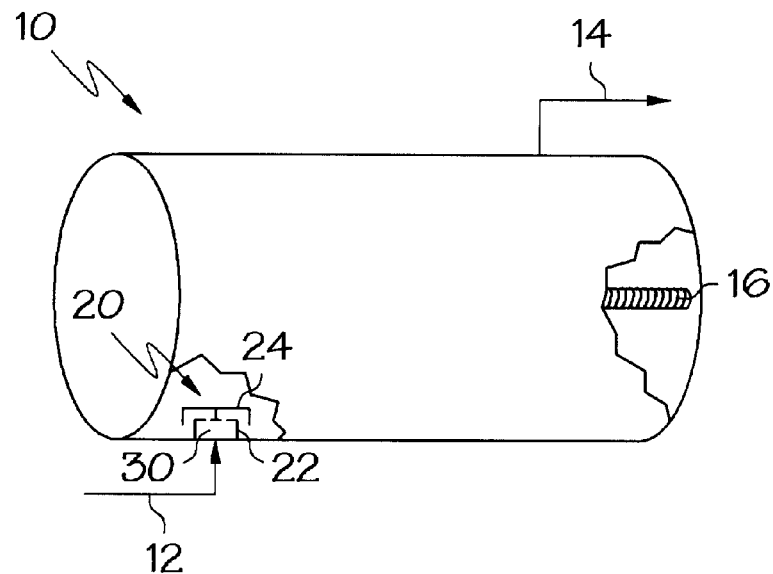
FIG. 1 is a partial schematic view of a water heating tank for use in accordance with the present invention.

Referring to FIG. 1, the apparatus and method of the present invention is preferably used in a water heating tank, generally designated 10. While a generally annular tank 10 is preferred, the tank may also be other suitable shapes, including saddle shaped, rectangular shaped, etc. The tank 10 preferably includes a water inlet 12 near the bottom of the tank 10, a water outlet 14 near the top of the tank 10 and a heating element 16. A baffle assembly, generally designated 20, is positioned over the water inlet 12 in order to re-direct and slow the flow of water entering the tank 10 so that the turbulence in the tank 10 is minimized. The baffle assembly 20 is preferably of relatively simple construction, is generally inexpensive to produce, and may be used in water boosters of the type used in commercial warewashing applications.

Figure 2:
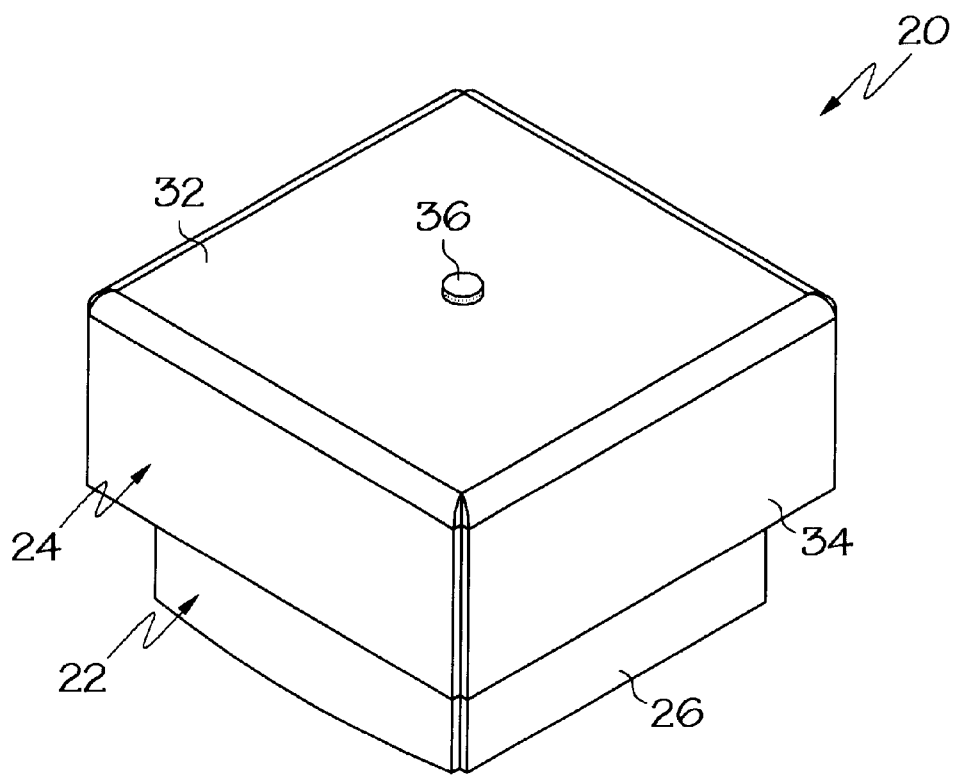
FIG. 2 is a side perspective view of a baffle for use in accordance with the present invention.
Figure 3:
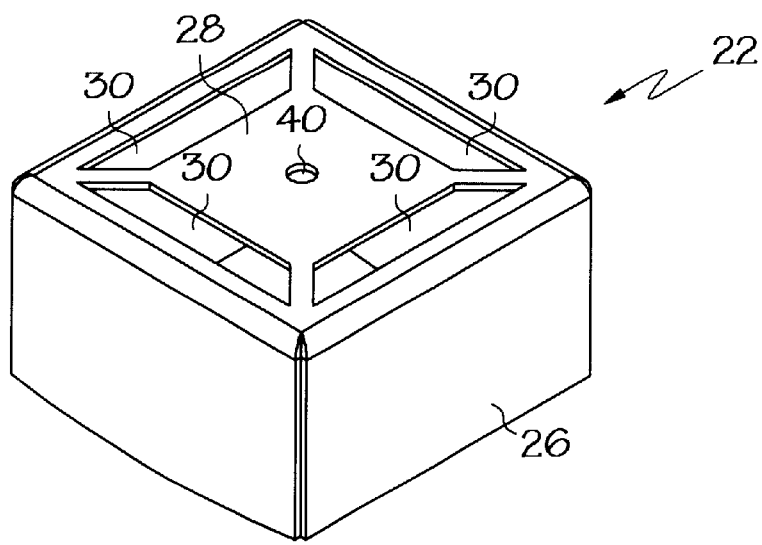
FIG. 3 is a side perspective view of the inner cap of the baffle of FIG. 2.
Figure 4:
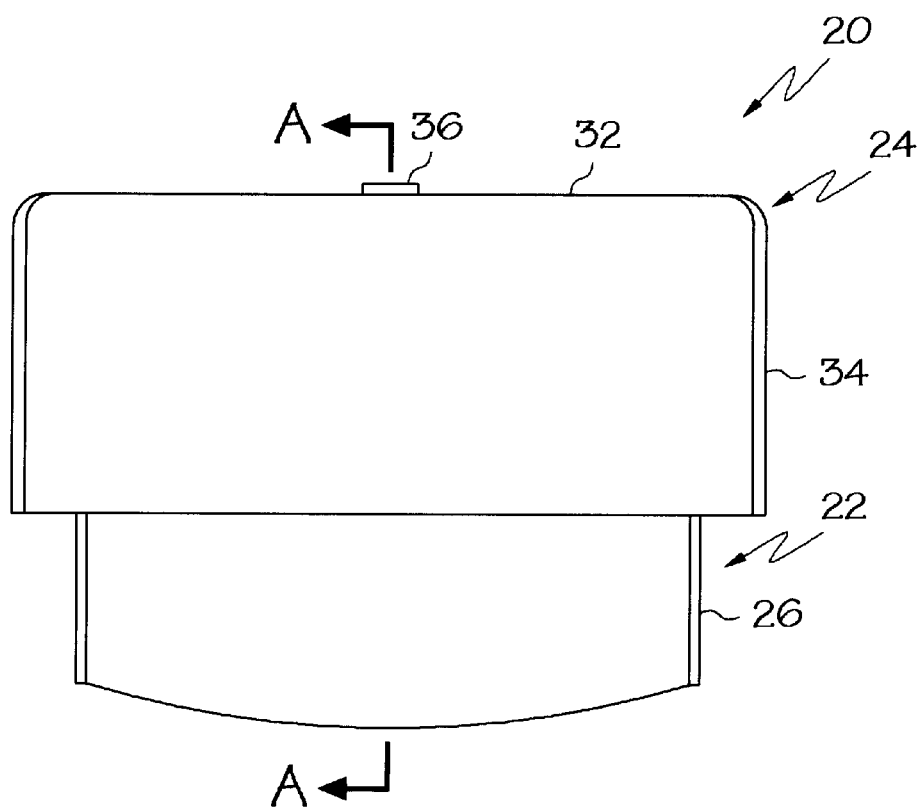
FIG. 4 is a side elevational view of the baffle of FIG. 2.
Figure 5:
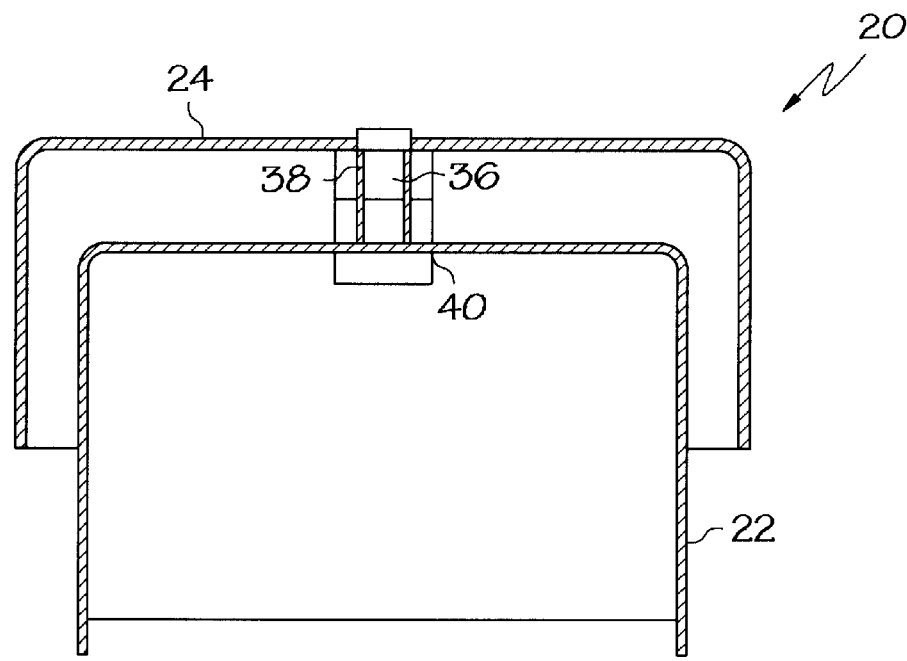
FIG. 5 is a side elevational view of the baffle of FIG. 2 taken along line A—A of FIG. 4.
Figure 6:
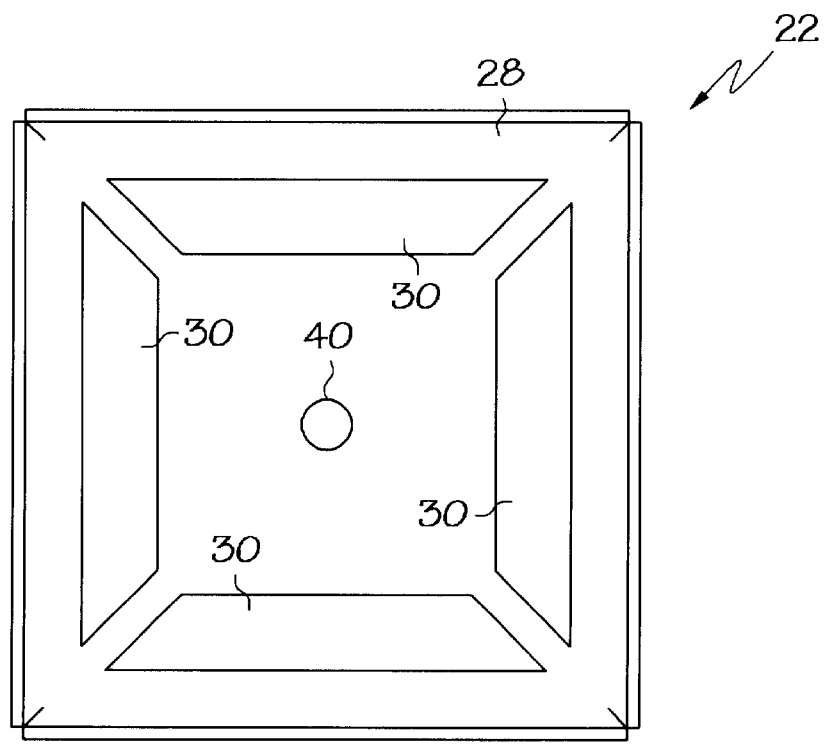
FIG. 6 is a top plan view of the inner cap of the baffle of FIG. 2.
Figure 7:
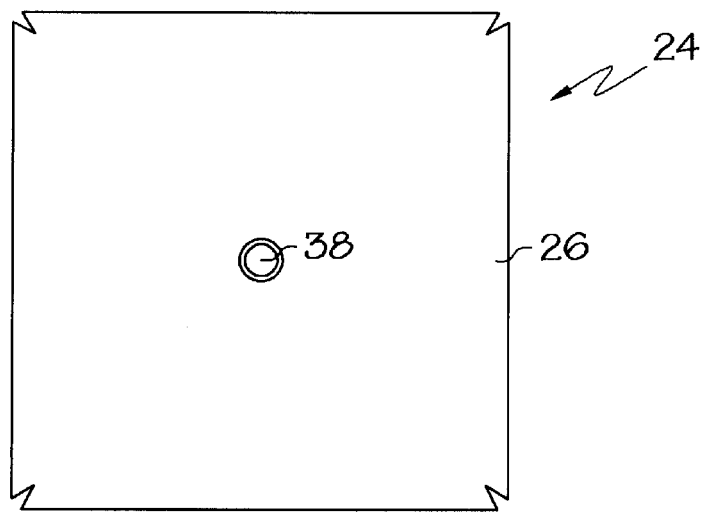
FIG. 7 is a top plan view of the outer cap of the baffle of FIG. 2.

In a preferred embodiment, as shown best in FIGS. 2–7, the baffle assembly 20 is positioned over the inlet 12 to the water heating tank 10 and consists of an inner cap 22 and an outer cap 24. The inner cap 22 is preferably a collar-like base 26 with a cover 28 attached to the top portion of the base 26. The cover 28 is preferably provided with openings 30 which may be of varying shapes and sizes, although in the preferred embodiment shown herein as best seen in FIGS. 3 and 6, the openings 30 are generally trapezoidal in shape.

As shown best in FIGS. 2 and 5, the outer cap 24 preferably consists of a cover 32 and a flange 34 which depends downwardly from the cover 32 around the base 26 of the inner cap 22. The outer cap 24 is positioned above and spaced apart from the inner cap 22 such that water from the inlet 12 may flow through the openings 30 and impinge against the bottom of the cover 32 of the outer cap 24. The water then flows relatively smoothly along the inside of the flange 34 and out into the tank 10. The outer cap 24 is preferably attached to the inner cap 22 by a rod or bolt 36 which is attached to the cover 32 of the outer cap 24 through hole 38 and through the cover 28 of the inner cap 22 through hole 40. While this method of attaching and spacing apart the inner 22 and outer 24 caps is shown and described in the preferred embodiment, it is to be understood that other structures, including brackets or posts attached directly to the inside of the tank 10 could be used to support the outer cap 24 above the inner cap 22 and are considered within the scope of the invention.

Figure 8:
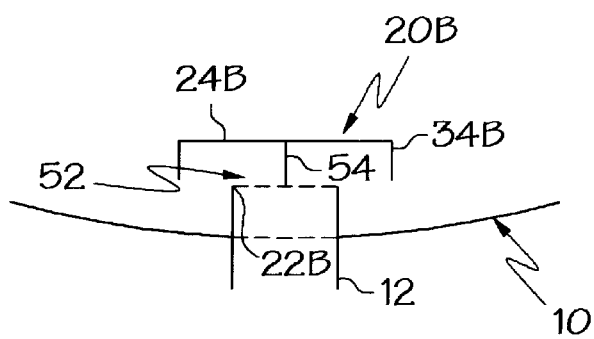
FIG. 8 is a side elevational view of an alternate embodiment of the invention.

As shown best in FIG. 8, in an alternate embodiment of the invention, the baffle assembly 20B consists of an outer cap 24B having a flange 34B that depends downwardly therefrom. In this embodiment, the inlet 12 includes an inlet pipe 50 which extends at least partially into the tank 10. A bracket 52 including a spacer element 54 is used to position the outer cap 24B over the inlet pipe 50 thereby deflecting the incoming water away from the tank 10 outlet (not shown). In a preferred version of this embodiment, an inner cap 22B having perforations therein is provided to help control fluid flow into the tank 10.

Figure 9:
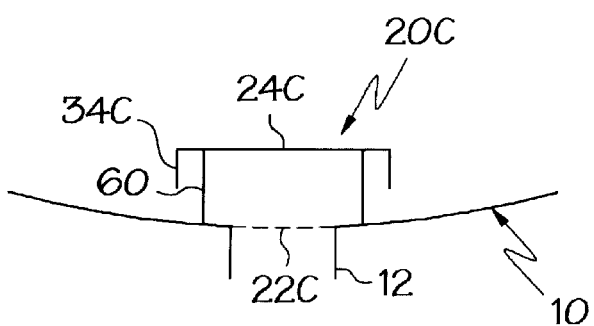
FIG. 9 is a side elevational view of an alternate embodiment of the invention.

As shown best in FIG. 9, in another alternate embodiment of the invention, the baffle assembly 20C consists of an outer cap 24C having a flange 34C that depends downwardly therefrom. In this embodiment, a bracket 60 is used to position the outer cap 24C over the inlet 12 thereby deflecting the incoming water away from the tank 10 outlet (not shown). In a preferred version of this embodiment, an inner cap 22C having perforations therein is provided to help control fluid flow into the tank 10.

Figure 10:
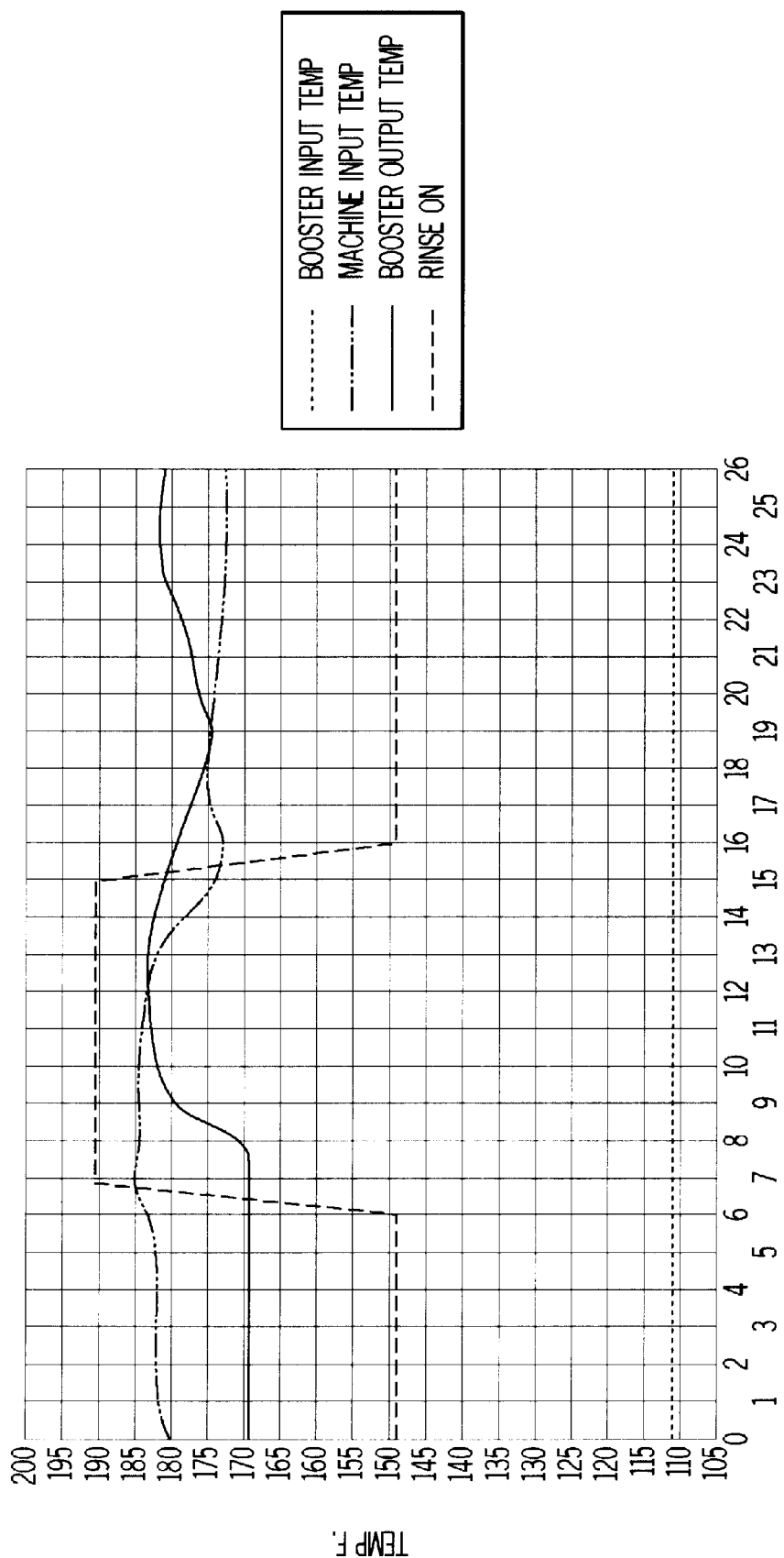
FIG. 10 is a graph of booster outlet temperature vs. time in a prior art booster not utilizing a baffle in conformance with the present invention.
Figure 11:
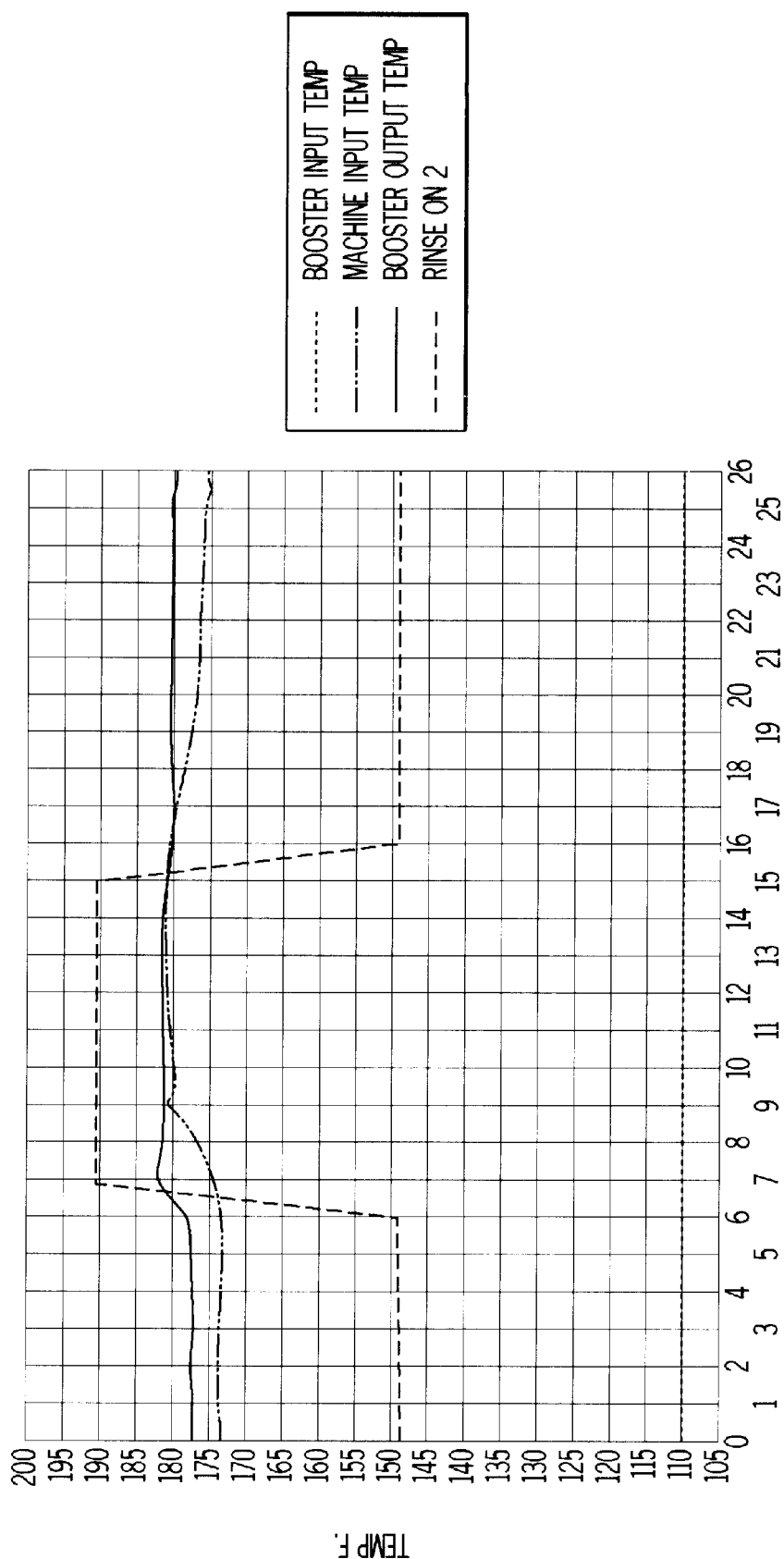
FIG. 11 is a graph of booster outlet temperature vs. time in a novel booster utilizing a baffle in conformance with the present invention.

As shown in FIGS. 10 and 11, water booster heaters incorporating a baffle in accordance with the present invention have shown significant improvement in temperature control for booster outlet temperature. Specifically, as can be seen in FIG. 10, prior art boosters not incorporating an inlet baffle in accordance with the present invention, exhibit large temperature fluctuations of booster outlet temperatures over cycle time. In contrast, as shown in FIG. 11, water booster heaters incorporating an inlet baffle as described herein exhibit booster outlet temperature having little fluctuation over cycle time.

While the form of the apparatus herein described constitutes a preferred embodiment of the invention, it is to be understood that the invention is not limited to this precise form of apparatus, and that changes may be made therein without departing from the scope of the invention.

What is claimed is:

1. A fluid heating tank comprising:

a fluid heating tank laying on its side and having an inlet located in an annular sidewall of said tank at a lower portion of said tank and an outlet located at an upper portion of said tank higher than said inlet; and a baffle assembly positioned within said tank over said inlet, said baffle assembly comprising:

an inner cap positioned over said inlet including a collar-like base having an inner cover attached to the top portion of said base said inner cover having openings therein to control fluid flow into said tank; and an outer cap attached to and spaced apart from said inner cap by a spacer, said outer cap having a flange depending downwardly therefrom such that water flowing through said inlet may flow through said openings and impinge against a bottom of said outer cap continuing relatively smoothly along the inside of said flange and out into said tank.

2. The fluid heating tank of claim 1 wherein said flange at least partially surrounds said inner cap.

3. The fluid heating tank of claim 1 wherein said openings are trapezoidal in shape.

4. The fluid heating tank of claim 1 wherein said outer cap is generally square in shape.

5. The fluid heating tank of claim 1 wherein said inner cap is generally square in shape.

6. The fluid heating tank of claim 1 wherein said tank is a water heating booster for use with a commercial warewasher.

7. A fluid heating tank comprising:

a fluid heating tank laying on its side and having an inlet located in an annular sidewall of said tank at a lower portion of said tank and an outlet located at an upper portion of said tank higher than said inlet; and a baffle assembly positioned within said tank over said inlet, said baffle assembly comprising:

an inner cap positioned over said inlet including a collar-like base having an inner cover attached to the top portion of said base, said inner cover having openings therein to control fluid flow into said tank; and an outer cap positioned over said inner cap wherein said outer cap is supported by brackets depending from said sidewall of said tank, said outer cap having a flange depending downwardly therefrom such that water flowing through said inlet may flow through said openings and impinge against a bottom of said outer cap continuing relatively smoothly along the inside of said flange and out into said tank.

* * * * *